United States Patent [19]

Wylie et al.

[11] Patent Number: 4,773,324
[45] Date of Patent: Sep. 27, 1988

[54] BROCCOLI TRIMMING MACHINE

[75] Inventors: John V. Wylie; David K. Lewis, both of Salinas, Calif.

[73] Assignee: J. R. Simplot Company, Boise, Id.

[21] Appl. No.: 88,153

[22] Filed: Aug. 21, 1987

[51] Int. Cl.[4] .................. A23N 15/02; A47J 21/00
[52] U.S. Cl. ...................................... 99/638; 99/642; 99/643
[58] Field of Search .................... 99/635–639, 99/641–643, 546; 426/481, 484, 518

[56] References Cited

U.S. PATENT DOCUMENTS

| | | |
|---|---|---|
| 2,663,936 | 12/1953 | Gransden . |
| 3,252,491 | 5/1966 | Wooldridge . |
| 3,320,989 | 5/1967 | Verardo . |
| 3,380,500 | 4/1968 | Alpen .................. 99/637 |
| 3,382,901 | 5/1968 | Pheterson . |
| 3,478,794 | 11/1969 | Alpen .................. 99/637 |
| 3,478,795 | 11/1969 | Thornsbery . |
| 3,646,977 | 3/1972 | Goodale . |
| 3,690,049 | 9/1972 | Roberson . |
| 3,695,323 | 10/1972 | Akesson et al. ........ 99/637 |
| 3,754,470 | 8/1973 | Console .................. 99/538 |
| 3,886,857 | 6/1975 | Goodale ................ 99/642 |
| 4,004,502 | 1/1977 | Tomelleri ............... 99/593 |
| 4,099,456 | 7/1978 | Cornish .................. 99/638 |
| 4,157,681 | 6/1979 | Akesson ................. 99/538 |
| 4,168,642 | 9/1979 | Evans .................. 83/404.3 |
| 4,176,595 | 12/1979 | Shaw .................... 99/638 |
| 4,211,616 | 7/1980 | Jourdan et al. ........ 99/638 |
| 4,455,929 | 6/1984 | Goudarzi et al. ..... 99/637 |
| 4,480,536 | 11/1984 | Burns ................... 99/639 |
| 4,658,714 | 4/1987 | McIlvain et al. ...... 99/637 |

Primary Examiner—Timothy F. Simone
Attorney, Agent, or Firm—Kelly, Bauersfeld & Lowry

[57] ABSTRACT

An improved broccoli trimming machine is provided for cutting or scalping broccoli heads in a manner yielding separated broccoli fleurettes of substantially uniform size and shape. The improved broccoli trimming machine includes an indexing mechanism with clamp units for holding and indexing broccoli heads to a scalping station. A bowl-shaped cutter at the scalping station is moved into cutting relation with the broccoli heads to scalp each head along a curved, substantially semi-spherical line to approximate the curved contour of the top of a broccoli head to be cut, thereby separating the head into individual fleurettes of substantially uniform size and shape.

23 Claims, 6 Drawing Sheets

FIG. 9
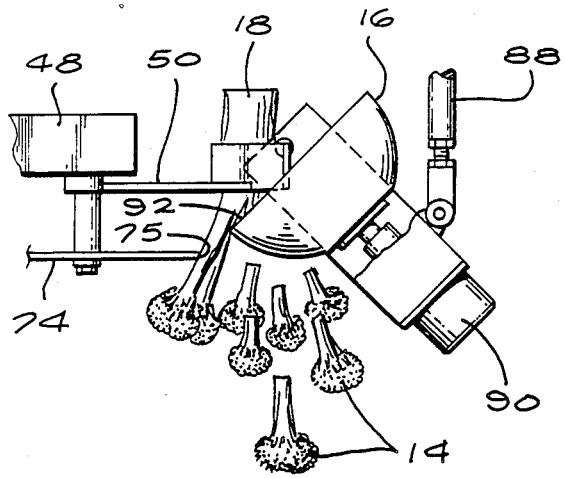
FIG. 10
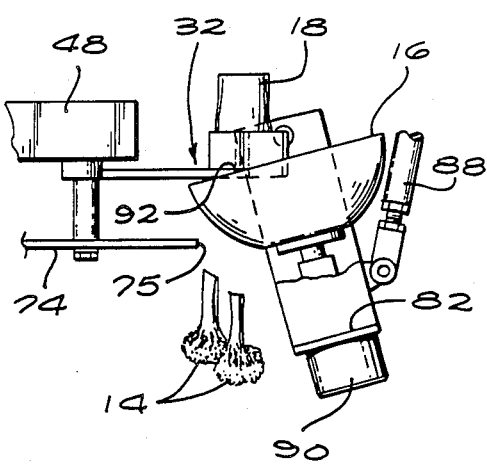
FIG. 11
FIG. 13
FIG. 12
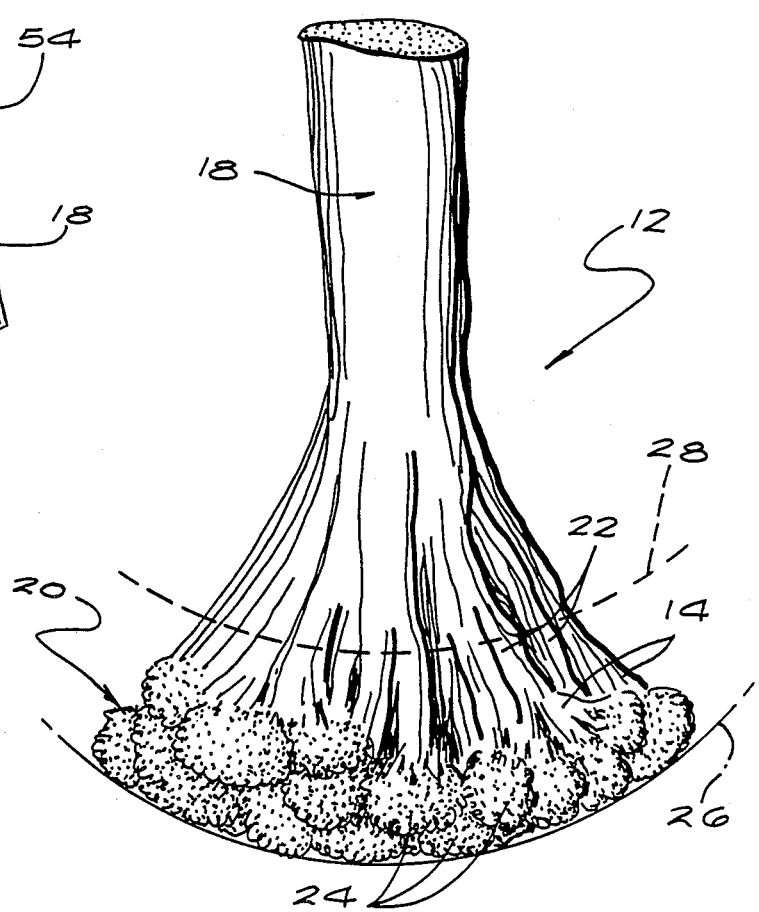

BROCCOLI TRIMMING MACHINE

BACKGROUND OF THE INVENTION

This invention relates to apparatus and methods for cutting vegetables and other produce particularly such as broccoli. More specifically, this invention relates to an improved cutter or trimmer designed to trim broccoli or similar produce items in a manner yielding small individual pieces of substantially uniform size and shape.

A variety of vegetable and other produce items are generally known to require cutting or trimming prior to packaging and/or shipment to consumer markets. Exemplary of such produce items are broccoli and cauliflower and the like which generally grow in the form of stalked heads having an overall size frequently exceeding the size of a standard consumer unit. Alternately, or in addition, the stalked head has a size and shape which is not conducive to convenient space-efficient packaging. Accordingly, produce items of this type are commonly trimmed to a required size and shape promptly after picking.

In the past, produce items such as broccoli and cauliflower have been cut or trimmed by the use of manual labor to insure relative uniformity in the resultant cut products notwithstanding natural growth variations in the uncut product. The use of manual labor, however, adds significantly to the overall cost of the product to the ultimate consumer.

Many different automated or semi-automated machines have been proposed for use in cutting and trimming vegetables such as broccoli and cauliflower, wherein such machines have been intended in large degree to reduce the requirement for manual labor in preparing the produce for the consumer market. See, for example, the broccoli trimming machines described in U.S. Pat. Nos. 4,658,714 and 3,646,977. In general terms, these and other machines for trimming broccoli and the like have included cutting knives for removing excess butt portions of the produce stalk and/or for longitudinally segmenting produce heads into quadrants or some other selected number of pieces intended to be substantially uniform in size. These segmented pieces essentially comprise broccoli heads of reduced size each defined by a group of broccoli fleurettes attached to a remaining portion of the stalk.

While cutting machines of the above-described type have performed satisfactorily for their intended purposes, they have not been able to provide certain specific produce cuts designed for certain market uses. For example, particularly with respect to broccoli, it is frequently desirable to cut the broccoli head into relatively small individual separated fleurettes for use in frozen food products, restaurants, salad bars, and the like. However, the top of an uncut broccoli head has a curved substantially semi-spherical contour, whereas prior broccoli cutting and trimming machines have been designed to make a variety of straight or virtually straight produce cuts. Accordingly, these prior machines have not been able to separate the broccoli head into individual fleurettes of substantially uniform size and shape. Instead, machine-cut fleurettes have necessarily exhibited significant piecewise size variation. Where piecewize size uniformity has been desired, manual labor has still been used.

There exists, therefore, a significant need for an improved broccoli trimming machine and related trimming process for cutting individually separated broccoli fleurettes of substantially uniform size and shape from a broccoli head. The present invention fulfills these needs and provides further related advantages.

SUMMARY OF THE INVENTION

In accordance with the invention, an improved broccoli trimming machine is provided for cutting individual broccoli fleurettes of substantially uniform size and shape from broccoli heads. The individual fleurettes are cut with a bowl-shaped cutter designed to scalp the fleurettes from a broccoli head along a substantially semi-spherical line approximating the curved contour of the top of a broccoli head to be cut.

In a preferred form of the invention, the improved broccoli trimming machine comprises an indexing mechanism for indexing a plurality of clamp units in sequence through a progression of work stations, wherein one of these work stations comprises a scalping station at which the bowl-shaped cutter is located. In one preferred arrangement, the clamp units are indexed and halted in sequence at a loading station, a segmenting station, the scalping station, and a stalk discharge station. The clamp units are adapted to open upon arrival at the loading station for easy reception of a broccoli head to be cut. Gauge means at the loading station insures proper broccoli head orientation for subsequent cutting. The clamp unit then closes upon and grasps the broccoli head for transfer to the segmenting station whereat a segmenting knife of selected configuration can be advanced longitudinally into the broccoli head to form a plurality of longitudinally cut segments. A butt cut knife may also be disposed at or near the segmenting station for removing excessive stalk butt portions. The clamp unit then indexes the supported broccoli head to the scalping station of engagement with the bowl-shaped cutter to scalp individual broccoli fleurettes from the suspended broccoli head. Finally, the scalped remainder of the broccoli head is indexed by the clamp unit to the stalk discharge station for release.

The bowl-shaped cutter comprises a generally semi-spherical knife element having a circular cutting edge for engaging a broccoli head at the scalping station. Backstop means at the scalping station conveniently retains the broccoli head in the desired position for positive cutting engagement with the bowl-shaped cutter. A lever mechanism displaces the bowl-shaped cutter through an arcuate path to swing the cutting head thereon through the supported broccoli head along a generally semi-spherical cutting line generally matching but space from the top surface contour of the broccoli head. Drive means are provided for rotating the bowl-shaped cutter about its central axis for enhanced cutting efficiency. Resultant cut fleurettes separated from the broccoli head have a substantially uniform size and shape irrespective of the region of the head from which each fleurette is cut.

In accordance with further aspects of the invention, the clamp units each comprise a pair of pivoting clamp arms drive together by pneumatic or equivalent drive means. A pair of pivoting clamp arms are driven by a meshed pair of drive gears which insure simultaneous clamp arm movements through substantially uniform displacements, and with substantially uniform clamp force applied to a broccoli stalk, irrespective of the specific stalk diametric size and shape.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 9 is a fragmented vertical sectional view similar to FIG. 8 and depicting further cutter movement to cut a broccoli head;

FIG. 10 is a fragmented vertical sectional view similar to FIGS. 8 and 9 and showing still further cutter movement at the scalping station;

FIG. 11 is a fragmented vertical sectional view showing a cut broccoli stalk discharge station;

FIG. 12 is an enlarged side elevation view depicting an inverted broccoli head and illustrating cutting thereof with the bowl-shaped cutter of FIGS. 8–10; and FIG. 13 is an enlarged side elevation view showing a broccoli fleurette resulting from broccoli head cutting at the scalping station.

DETAILED DESCRIPTION OF THE PREFERRED EMBODIMENT

Figure 1:
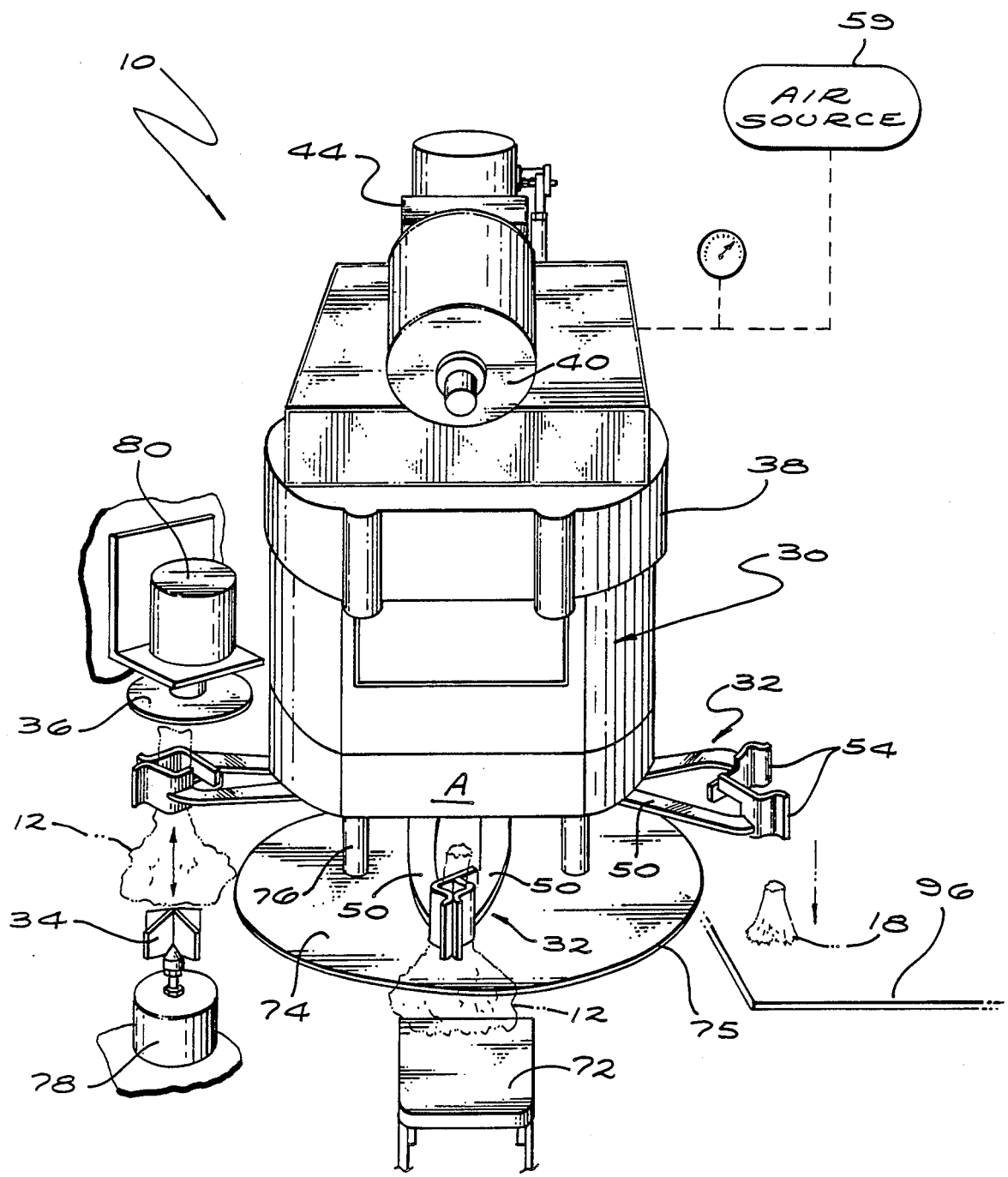
FIG. 1 is a fragmented perspective view illustrating a broccoli trimming machine embodying the novel features of the invention.

As shown in the exemplary drawings, an improved broccoli trimming machine referred to generally by the reference numeral 10 is provided for scalping or cutting heads of broccoli 12 (FIG. 1) into individually separated small fleurettes 14 (FIGS. 9 and 12) of substantially uniform size and shape. The trimming machine 10 comprises means for indexing broccoli heads 12 in sequence into cutting engagement with a bowl-shaped cutter 16 (FIGS. 2, 3 and 8-10) which separates the individual fleurettes 14 by scalping them from a remaining stalk portion 18 of broccoli head 12.

The improved broccoli trimming machine 10 of the present invention is designed to cut broccoli heads 12 and the like quickly, easily, and in a highly consistent manner to produce individual separated fleurettes 14 of substantially uniform size and shape. More particularly, with background reference to FIG. 12, an individual broccoli head 12 comprises a stalk portion 18 joined to a head portion 20 defined by a large plurality of relatively small stems 22 individually carrying broccoli flowers 24, wherein each stem 22 and its associated flowers 24 are commonly known as a fleurette. The stems 22 branch upwardly and outwardly from the stalk portion 18 (shown inverted in FIG. 12) in a manner positioning the broccoli flowers 24 to define a curved upper surface contour 26 of substantially part-spherical or semi-spherical shape. The improved broccoli cutter machine 10 is designed to separate the fleurettes 14 including the stems 22 and flowers 24 from the bulky stalk portion 18 along a part-spherical or semi-spherical cut line 28 which is spaced from and essentially concentric with the contour line 26. As a result, the improved machine 10 produces cut fleurettes 14 of substantially uniform size and shape irrespective of the precut position of each fleurette in the broccoli head 12. The cut fleurettes 14 thus exhibit a high degree of size and visual uniformity to provide an attractive produce item used, for example, in fresh salad bars at restaurants, or as a principle component in prepackaged frozen broccoli.

Figure 2:
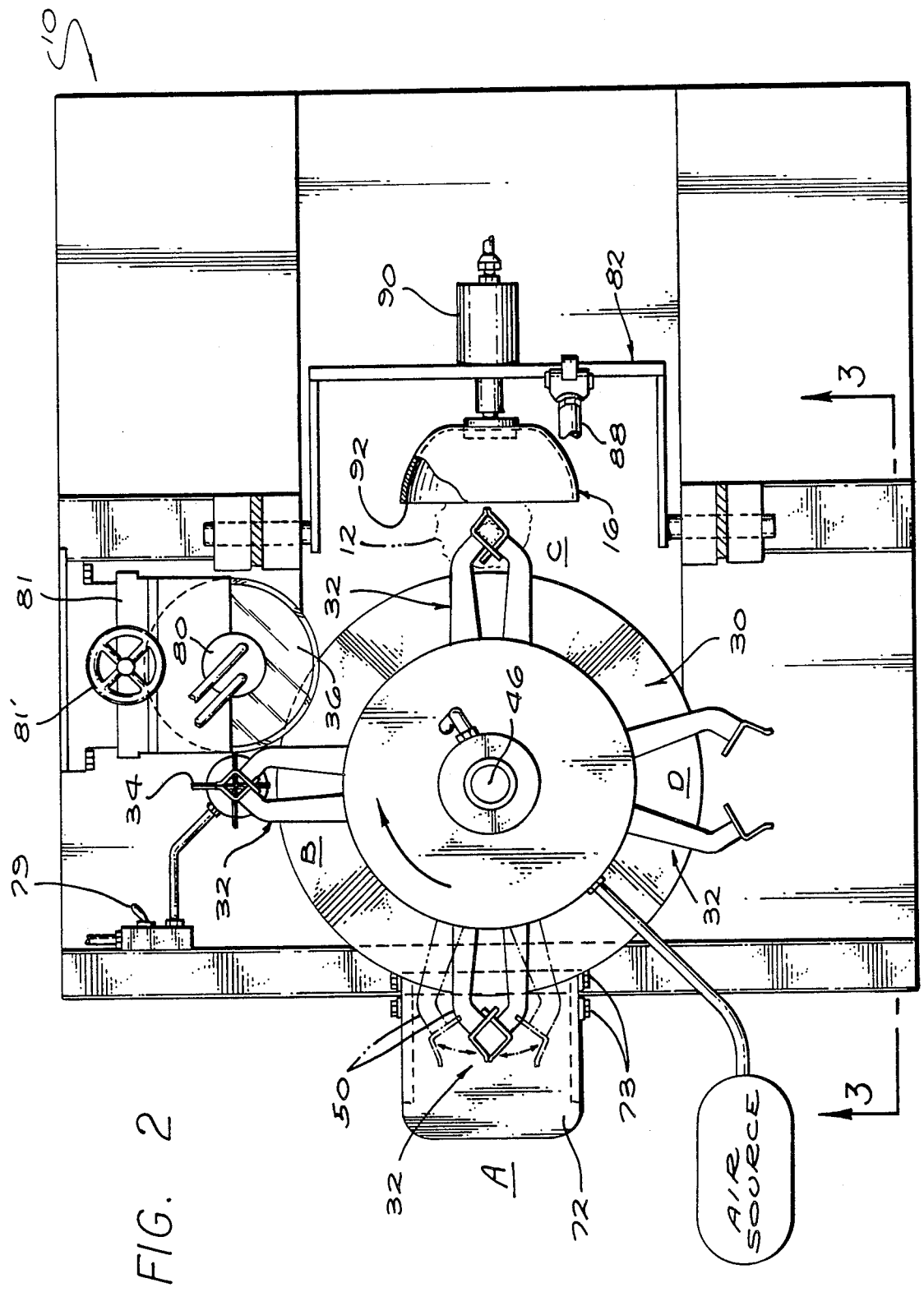
FIG. 2 is a top plan view of the broccoli trimming machine of FIG. 1, with portions removed to illustrate construction details thereof.

In general terms, with reference to FIGS. 1 and 2, the improved broccoli trimming machine comprises a central indexing mechanism 30 having a plurality of outwardly radiating clamp units 32, with four such clamp units being shown in the exemplary drawings at 90 degree intervals. The clamp units 32, the construction of which will be described in more detail, are adapted to close upon and grasp a broccoli head 12 at a loading station A to support the broccoli head in an inverted manner (FIG. 1). The indexing mechanism 30 transfers the supported broccoli head 12 to a segmenting station B for optional longitudinal division of the head portion 20 into multiple segments by use of a segmenting knife 34 or the like. The indexing mechanism 30 then transfers the suspended broccoli head to a scalping station C, with a butt cut knife 36 being provided between the segmenting and scalping stations to remove excess stalk portions, if desired. At the scalping station C, the bowl-shaped cutter 16 (FIG. 2) separates the individual fleurettes 14 from the remaining stalk portion 18, after which the indexing mechanism 30 transfers the remaining scalped stalk portion 18 to an unloading station D for appropriate discharge from the machine.

As shown best in FIG. 1, the indexing mechanism 30 comprises a central machine housing 38 having drive components mounted on the top thereof. In particular, a drive motor 40 such as an electric or hydraulic drive motor provides a rotational output coupled through an appropriate speed reduction gear box to an intermittent motion mechanism 44. This intermittent motion mechanism 44 may comprise a conventional cam operated indexing assembly such as a cam operated indexing device of the type manufactured by Camco, Inc. or the like, for producing timed rotary movements of an output shaft 46 through specified part-circle rotations. In the illustrative embodiment of the invention having four clamp units 32, the intermittent motion mechanism 44 is designed to rotate the output shaft 46 through individual part-circle increments of 90 degrees with intervening periods of rest during which the clamp units 32 are disposed at the individual stations A-D.

The lower end of the intermittently driven output shaft 46 is coupled to a turntable 48 (FIG. 4) having the clamp units 32 mounted thereon at 90 degree inntervals. The turntable 48 is rotatably driven by the output shaft 46 in an intermittent manner for transporting the clamp units 32 in sequence to the various operating stations of the machine.

Figure 4:
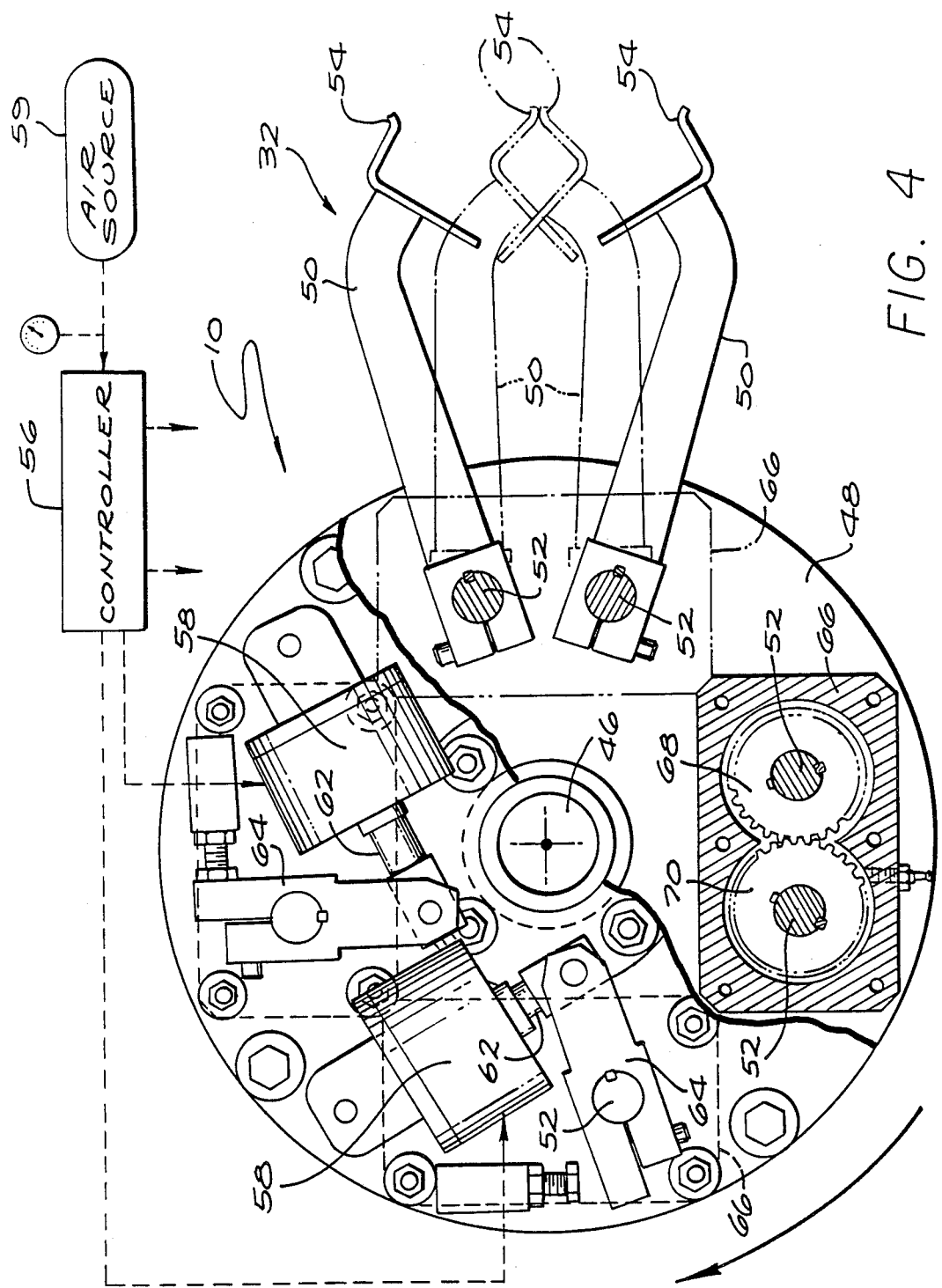
FIG. 4 is an enlarged fragmented horizontal sectional view taken generally on the line 4—4 of FIG. 3.

As shown best FIG. 4, each clamp unit 32 comprises a pair of clamp arms 50 having inboard ends keyed onto a respective pair of drive spindles 52 for rotation of the clamp arms 50 with said spindles 52. The outboard ends of the two clamp ends are turned slightly toward each other and carry angularly set gripper shoes 54 which cooperate, when the clamp arms 50 are rotated toward each other, to grasp and hold a broccoli head 12. Control means are provided on the turntable 48 with respect to each one of the clamp units 32 for rotating the clamp arms 50 slightly toward or slightly away from each other between closed and open positions respectively. Importantly, this closing and opening of the clamp arms 50 is controlled by an appropriate controller 56 in accordance with the particular indexed position of the clamp units 32 relative to the stations A–D.

The preferred clamp unit control means comprises a plurality of pneumatic cylinder units 58 mounted on the turntable 48 and appropriately supplied with pressurized air from a supply 59 or appropriately exhausted under the control of the controller 56. Each cylinder unit 58 includes a ram 62 coupled to a crank link 64 which is keyed in turn to one of the drive spindles 52 of the associated clamp unit 32. As shown in FIG. 4, the drive spindle 52 driven by the associated crank link 64 extends into a small gear box 66 and is keyed to a drive gear 68 therein which is meshed in turn with a driven gear 70 keyed with the second spindle 52 of the clamp unit 32. Supply of air under pressure to the cylinder unit 58 causes the ram unit 62 to extend thereby displacing the crank link 64 through a short angular stroke and correspondingly rotating the associated drive and driven gears 68 and 70 through a part-circle displacement in opposite directions. The directions of gear rotation, upon such compressed air supply, is effective to displace the gripper shoes 54 toward each other to grasp and support the stalk portion 18 of a broccoli head 12 (FIG. 1). Importantly, with this arrangement, the stroke magnitude of the gripper shoes 54 automatically varies sufficiently to grip each broccoli head 12 with the same gripping force, irrespective of natural stalk size variations encountered among broccoli heads to be cut. Moreover, the synchronized motion of the drive and driven gears insures reliable centering of each broccoli head relative to a predetermined radial position for accurate and repeatable cutting at subsequent stations, as will be described. Exhaustion of air under pressure from the cylinder units 58 is accompanied by a spring-loaded reverse stroke of the ram 62 to displace the gripper shoes 54 to the open position.

Figure 5:
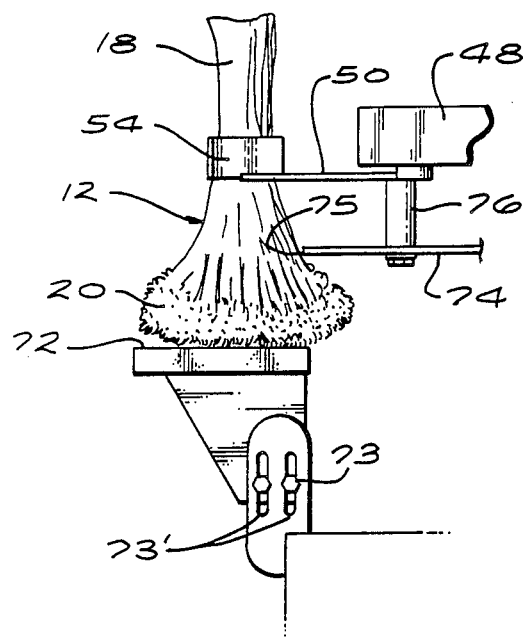
FIG. 5 is a fragmented vertical sectional view of a portion of the machine illustrating a broccoli loading station.

The controller 56 appropriately controls the position of the clamp arms 50 and the gripper shoes 54 of each clamp unit 32 such that the gripper shoes 54 are open as the clamp unit translates to the loading station A. The controller 56 maintains these gripper shoes 54 in the open position for a short time interval to permit a broccoli head 12 to be inserted between the gripper shoes 54, as shown best in FIGS. 1–3 and 5. In this regard, the machine 10 includes positioner means at the loading station A to facilitate correct broccoli head positioning in an inverted position relative to the gripper shoes 54. A preferred positioner means provides a platform 72 mounted on a stationary portion of the machine frame by bolts 73 passed through vertically elongated slots 73' in the platform 72 to accommodate vertical platform adjustment to the desired position. In addition, the positioner means includes a circular backstop plate 74 suspended in a generally horizontal position from support posts 76 beneath the turntable 48. A broccoli head 12 is placed with its stalk portion 18 extending upwardly between the gripper shoes 54, and with the top of the head portion 20 resting upon the adjstable platform 72. The backstop plate 74 provides a backstop edge 75 (FIG. 5) to insure correct radial positioning of the broccoli head 12 relative to the clamp unit 32. With the head 12 positioned as desired, the controller 56 closes the clamp arms 50 to grasp and support the broccoli head 12 with the gripper shoes 54.

Figure 6:
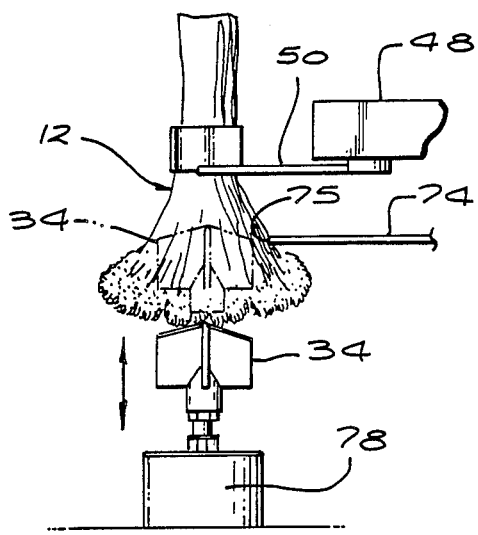
FIG. 6 is a fragmented vertical sectional view similar to FIG. 5 but illustrating a broccoli segmenting station.

The indexing mechanism 30 then rotates the clamp unit 32 with the suspended broccoli head 12 from the loading station A to the segmenting station B whereat rotation is halted for a short time interval. During this time interval, the segmenting knife 34 such as an X-shaped knife component can be advanced by means of a pneumatic cylinder unit 78 or the like to cut the broccoli head portion longitudinally into multiple segments (FIG. 6), such as for quadrants resulting from use of the X-shaped knife 34. Alternately, if desired, the segmenting knife 34 may be deactivated by appropriate operation of an on-off switch 79 (FIG. 2).

Figure 7:
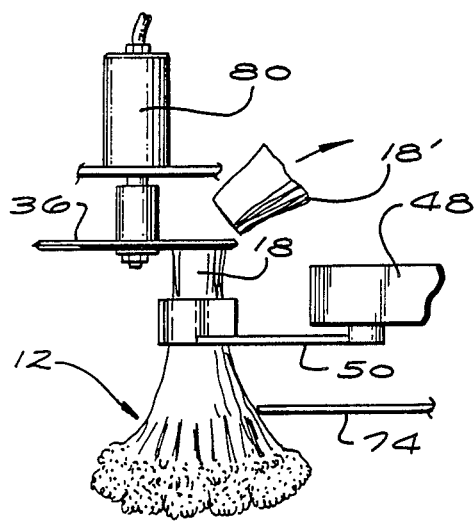
FIG. 7 is a fragmented vertical sectional view illustrating the construction and operation of a broccoli stalk butt knife.
Figure 8:
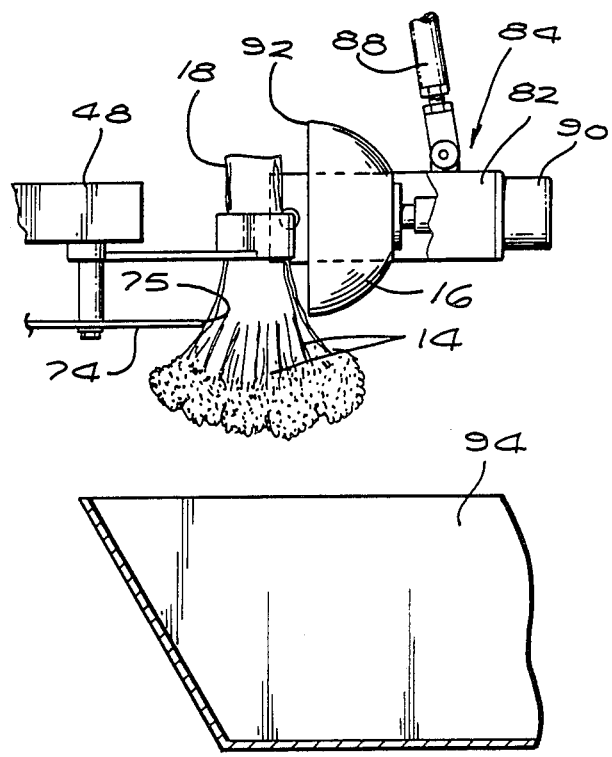
FIG. 8 is a fragmented vertical sectional view depicting a broccoli scalping station and initial movement of a bowl-shaped cutter into cutting relation with the broccoli head.

Following the short time interval at the segmenting station B, the indexing mechanism translates the suspended broccoli head 12 through the next arcuate stroke toward the scalping station C. During this movement, the upwardly projecting end of the stalk portion 18 is carried past engagement with the circular butt cut knife 36 (FIG. 7) which can be rotatably driven by a drive motor 80 for improved cutting efficiency. This butt cut knife 36 separates excess portions 18' of the stalk portion 18 from the remainder of the broccoli head. An adjustment mechanism 81 including a manually rotated adjustment wheel 81' (FIG. 2) may be provided to vary the vertical position of the butt cut knife 36.

At the scalping station C, the indexing mechanism again halts the suspended broccoli head for a short time interval. During this temporary cessation of indexing movement, the bowl-shaped cutter 16 is displaced into cutting engagement with the suspended broccoli head 12 to separate uniformly sized fleurettes 14 therefrom. This bowl-shaped cutter 16 comprises a generally semi-spherical cutting element supported from a central region of a generally U-shaped yoke member 82 mounted pivotally onto the machine frame. A drive linkage 84 (FIG. 3) is coupled to the yoke member and includes a crank link 86 driven by a motor 87 and coupled to the yoke member 82 via an output link 88 to sweep the cutter 16 from the outboard side of the suspended broccoli head 12 through approximately 90 degrees to a position underlying the broccoli head. During this movement, a small rotary motor 90 mounted on the yoke member 82 spins the cutter 16 about the central cutter axis thereby rotating a circular cutter edge 92 as the cutter edge engages the broccoli head along the part-spherical or semi-spherical cut line 28 (FIG. 12) to separate the fleurettes 14 from the stalk portion 18. During this cutting motion (FIGS. 8–10), the backstop plate 74 insures maintenance of broccoli head position without fleurette deflection away from the cutting edge 92, as shown best in FIG. 9. The cut fleurettes 14 fall from the still-suspended stalk portion 18 into an appropriate bin or conveyor means 94 (FIG. 8) for subsequent handling or processing as required.

Figure 3:
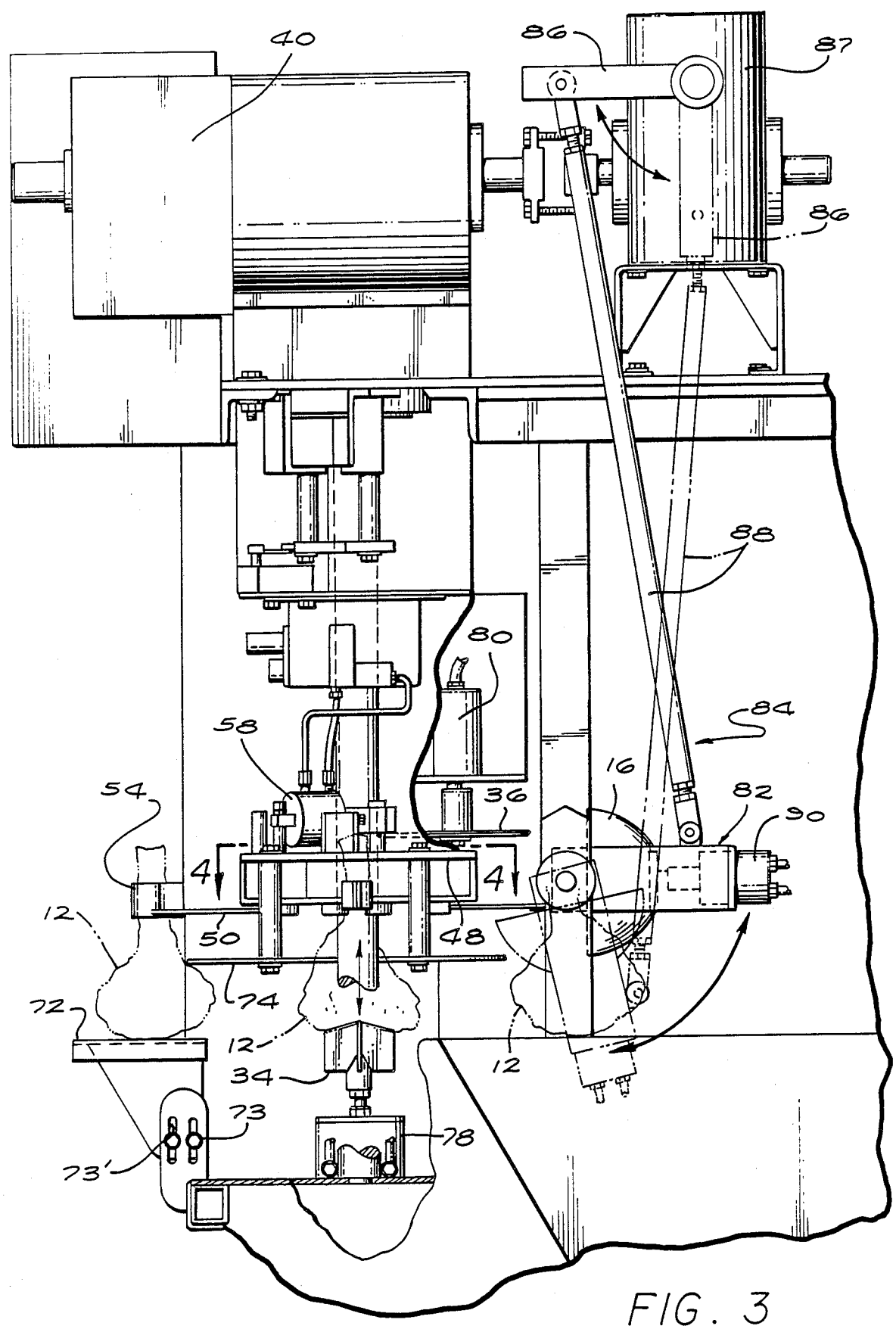
FIG. 3 is an enlarged fragmented side elevation view of the trimming machine taken generally on the line 3—3 of FIG. 2.

Following fleurette cutting, the drive linkage 84 returns the yoke member 82 and the supported cutter 16 to its initial outboard position, as shown in solid lines in FIG. 3. The indexing mechanism 30 then translates the still-suspeneded and now-scalped stalk portion 18 to the unloading or discharge station D. At this position, the clamp unit controller 56 appropriately opens the gripper shoes 54 to release the scalped stalk portion 18 (FIG. 11). Bin or conveyor means 96 (FIG. 1) are appropriately provided at this station for carrying the scalped stalk portions 18 for appropriate subsequent processing or the like.

Accordingly, the machine 10 of the present invention provides apparatus and a related processing method for quickly and easily scalping broccoli heads along a part-spherical cutting line to yield broccoli fleurettes of substantially uniform size and shape.

A variety of modifications and improvements to the broccoli trimming machine of the present invention will be apparent to those skilled in the art. Accordingly, no limitation of the invention is intended by way of the description herein or the accompanying drawings, except as set forth in the appended claims.

What is claimed is:

1. A broccoli trimming machine for trimming fleurettes of substantially uniform size and shape from a head of broccoli or the like, said machine comprising:
   a central indexing mechanism including means for grasping and supporting a head of broccoli; and
   a scalping station including a curved edge cutter, said central indexing mechanism including means for moving a broccoli head supported by said grasping and supporting means to said scalping station, said scalping station including means for displacing said curved edge cutter into cutting engagement with the broccoli head along a generally part-spherical cutting line to cut fleurettes of substantially uniform size and shape from the broccoli head.

2. The broccoli trimming machine of claim 1 further including a loading station, said grasping and supporting means being loaded with a head of broccoli at said loading station.

3. The broccoli trimming machine of claim 1 further including a discharge station, said grasping and supporting means discharging the scalped broccoli head at said discharge station.

4. The broccoli trimming machine of claim 1 further including a segmenting station, said central indexing mechanism including means for moving a head of broccoli supported by said grasping and supporting means to said segmenting station, said segmenting station including a segmenting knife for longitudinally cutting the broccoli head into a plurality of segments.

5. the broccoli trimming machine of claim 1 further including a butt cut knife for engaging and cutting the butt of the broccoli head upon movement thereof to said scalping station.

6. The broccoli trimming machine of claim 1 wherein said cutter is generally bowl-shaped, and further including means for rotating said bowl-shaped cutter generally about a central axis thereof.

7. The broccoli trimming machine of claim 1 wherein said means for grasping and supporting the broccoli head comprises at least one set of clamp arms projecting generally outwardly from said central indexing mechanism and having gripper shoes at the outboard ends thereof, and means for opening and closing said clamp arms with respect to each other to releasably grip the stalk of a broccoli head therebetween.

8. The broccoli trimming machine of claim 7 wherein said clamp arms and associated gripper shoes are adapted to support a broccoli head in an inverted position.

9. The broccoli trimming machine of claim 7 wherein said clamp arms are rotatably supported by a respective pair of drive spindles rotatable in turn with a meshed pair of gears, and further including fluid drive means for rotating said gears to open and close said clamp arms.

10. The broccoli trimming machine of claim 1 wherein said cutter is shaped to cut the broccoli head along a generally part-spherical cutting line generally concentric with the part-spherical contour of the top surface of the broccoli head.

11. The broccoli trimming machine of claim 1 further including a loading station having an adjustably positioned platform and backstop means for placement of a broccoli head thereagainst to align the broccoli head relative to said grasping and supporting means.

12. The broccoli trimming machine of claim 11 wherein said backstop means further retains the broccoli head against substantial reaction deflection upon cutting engagement of said cutter therewith.

13. The broccoli trimming machine of claim 1 wherein said central indexing mechanism comprises means for rotating the supported broccoli head through a part-circle path of predetermined dimension and then halting the broccoli head for a predetermined time period.

14. A broccoli trimming machine for trimming fleurettes of substantially uniform size and shape from a head of broccoli or the like, said machine comprising:
   a central indexing mechanism including a plurality of generally outwardly projecting clamp units each including a pair of clamp arms movable between open and closed positions;
   a broccoli head loading station;
   a broccoli head scalping station;
   a broccoli head discharge station;
   said indexing mechanism including means for indexing said clamp units together through a part-circle rotation and then for halting said clamp units for a predetermined time period with said clamp units in operative association respectively with said loading, scalping, and discharge stations, whereby said clamp units are rotated to and stopped in sequence at said loading, scalping, and discharge stations;
   means for positioning the clamp arms of each clamp unit in the open position during at least a portion of the time period of said clamp unit at said loading station, and then closing said clamp arms to grasp and support a head of broccoli placed therebetween;
   a generally bowl-shaped cutter disposed at said scalping station, and means for moving said bowl-shaped cutter into cutting engagement with a head of broccoli supported by one of the clamp units at said scalping station to cut a plurality of fleurettes of substantially uniform size and shape from the broccoli head; and
   means for opening the clamp arms of each clamp unit at said discharge station to discharge the scalped broccoli head.

15. The broccoli trimming machine of claim 14 further including a segmenting station located between said loading station and said scalping station, said segmenting station including a segmenting knife for longitudinally separating a broccoli head into a plurality of segments, and means for advancing said segmenting knife into cutting association with the broccoli head.

16. The broccoli trimming machine of claim 14 further including a butt cut knife for engaging and cutting the butt of a broccoli head upon movmement thereof to said scalping station.

17. The broccoli trimming machine of claim 14 further including means for rotating said bowl-shaped cutter generally about a central axis thereof.

18. The broccoli trimming machine of claim 14 wherein said bowl-shaped cutter is shaped to cut the broccoli head along a generally part-spherical cutting line generally concentric with the part-spherical contour of the top surface of the broccoli head.

19. A broccoli trimming machine for trimming fleurettes of substantially uniform size and shape from a head of broccoli or the like, said machine comprising:
   a scalping station including a generally bowl-shaped cutter;
   means for supporting a head of broccoli in a position for cutting engagement by said bowl-shaped cutter; and
   means for moving said bowl-shaped cutter into cutting engagement with the broccoli head to cut a plurality of fleurettes of substantially uniform size and shape from the broccoli head.

20. A broccoli trimming machine for trimming fleurettes of substantially uniform size and shape from a head of broccoli or the like, said machine comprising;
   a loading station including means for receiving a head of broccoli in a predetermined position;
   clamp means for grasping and supporting the head of broccoli placed in said predetermined position at said loading station;
   a segmenting station including a segmenting knife for longitudinally cutting a head of broccoli at said segmenting station into a plurality of segments;
   a butt cut knife for cutting the stalk of a broccoli head;
   a scalping station including a generally bowl-shaped cutter and means for moving said cutter into cutting relation with a broccoli head at said scalping station to cut fleurettes from the broccoli head;
   a discharge station for discharging a scalped broccoli head from the machine; and
   means for moving said clamp means in sequence to said loading station, said segmenting station, said scalping station, and said discharge station.

21. The broccoli trimming machine of claim 20 wherein said butt cut knife is disposed between said segmenting and said scalping stations.

22. The broccoli trimming machine of claim 20 further including means for selectively deactivating said segmenting knife.

23. The broccoli trimming machine of claim 20 further including means for rotating said bowl-shaped cutter about a central axis thereof.

* * * * *